United States Patent
Kaifu

(10) Patent No.: US 10,197,021 B2
(45) Date of Patent: *Feb. 5, 2019

(54) AIR FLOW MEASURING DEVICE

(71) Applicant: DENSO CORPORATION, Kariya, Aichi-pref. (JP)

(72) Inventor: Teruaki Kaifu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,004

(22) Filed: Mar. 1, 2018

(65) Prior Publication Data

US 2018/0187635 A1 Jul. 5, 2018

Related U.S. Application Data

(63) Continuation of application No. 15/178,628, filed on Jun. 10, 2016, now Pat. No. 9,938,939, which is a continuation of application No. 14/262,998, filed on Apr. 28, 2014, now Pat. No. 9,677,515.

(30) Foreign Application Priority Data

May 9, 2013 (JP) .................................. 2013-99164

(51) Int. Cl.
*G01F 1/68* (2006.01)
*F02M 35/10* (2006.01)
*G01F 1/69* (2006.01)
*G01F 1/684* (2006.01)
(Continued)

(52) U.S. Cl.
CPC ....... *F02M 35/10386* (2013.01); *G01F 1/684* (2013.01); *G01F 1/69* (2013.01); *G01F 5/00* (2013.01); *G01K 13/02* (2013.01)

(58) Field of Classification Search
CPC ..... F02M 35/10386; G01F 5/00; G01F 1/684; G01F 1/69; G01K 13/02
USPC .............. 73/204.25, 204.11, 204.16, 204.17, 73/204.19, 204.22, 204.23, 204.26, 73/204.27

See application file for complete search history.

(56) References Cited

U.S. PATENT DOCUMENTS

| 5,756,893 | A | 5/1998 | Kondo et al. |
| 6,070,462 | A * | 6/2000 | Igarashi ............... F02D 41/187 |
| | | | 73/114.34 |
| 6,336,361 | B1 | 1/2002 | Uramachi |

(Continued)

FOREIGN PATENT DOCUMENTS

| JP | 2009-008619 A | 1/2009 |
| JP | 2011-106868 A | 6/2011 |
| JP | 2013-104759 A | 5/2013 |

OTHER PUBLICATIONS

Pending U.S. Appl. No. 16/058,547, filed Aug. 8, 2018, a continuation of pending U.S. Appl. No. 15/909,004.

*Primary Examiner* — Jonathan Dunlap

(57) ABSTRACT

A sensor assembly includes a sensor portion and a sensor circuit, which are integrated with each other and configured to measure an air flow quantity. A thermistor is configured to measure an air temperature. A metal plate includes a grounding end terminal. One lead wire of the thermistor is joined electrically with the grounding end terminal. The sensor circuit is disposed on the metal plate. The sensor circuit is entirely overlapped with the plate shape portion in a direction perpendicular to the metal plate.

20 Claims, 2 Drawing Sheets

(51) Int. Cl.
*G01F 5/00* (2006.01)
*G01K 13/02* (2006.01)

(56) References Cited

U.S. PATENT DOCUMENTS

| | | | |
|---|---|---|---|
| 6,513,375 B2 | 2/2003 | Uramachi | |
| 6,557,410 B2 | 5/2003 | Uramachi | |
| 6,598,472 B2 * | 7/2003 | Igarashi | F02D 41/187 73/204.22 |
| 6,725,715 B2 * | 4/2004 | Igarashi | F02D 41/187 73/204.22 |
| 6,729,182 B2 | 5/2004 | Uramachi | |
| 6,782,744 B1 * | 8/2004 | Tashiro | F02D 41/187 73/204.22 |
| 6,820,480 B2 | 11/2004 | De'Stefani et al. | |
| 6,952,968 B2 * | 10/2005 | Kozawa | G01F 1/6842 73/756 |
| 7,047,939 B2 * | 5/2006 | Sakurai | F02D 41/3005 123/184.21 |
| 7,281,423 B2 * | 10/2007 | Igarashi | F02D 41/187 73/204.11 |
| 7,373,815 B2 * | 5/2008 | Kozawa | G01F 1/6842 73/204.22 |
| 7,712,361 B2 | 5/2010 | Uramachi | |
| 8,813,556 B2 | 8/2014 | Matsumoto et al. | |
| 8,844,348 B2 | 9/2014 | Suzuki et al. | |
| 9,383,240 B2 * | 7/2016 | Kohno | G01F 1/6845 |
| 9,677,515 B2 * | 6/2017 | Kaifu | F02M 35/10386 |
| 9,791,306 B2 * | 10/2017 | Tashiro | G01F 1/696 |
| 9,938,939 B2 * | 4/2018 | Kaifu | F02M 35/10386 |
| 2001/0027683 A1 * | 10/2001 | Igarashi | F02D 41/187 73/204.22 |
| 2003/0056585 A1 * | 3/2003 | Furuki | G01F 1/696 73/204.19 |
| 2003/0084718 A1 * | 5/2003 | Igarashi | F02D 41/187 73/204.22 |
| 2003/0209067 A1 * | 11/2003 | Igarashi | F02D 41/187 73/204.11 |
| 2004/0060361 A1 * | 4/2004 | Kozawa | G01F 1/6842 73/753 |
| 2004/0177684 A1 * | 9/2004 | Igarashi | F02D 41/187 73/204.11 |
| 2009/0000366 A1 | 1/2009 | Uramachi | |
| 2011/0296904 A1 * | 12/2011 | Tagawa | G01F 1/684 73/114.32 |
| 2012/0085163 A1 * | 4/2012 | Yamaguchi | G01F 1/00 73/204.25 |
| 2012/0160024 A1 | 6/2012 | Matsumoto et al. | |
| 2012/0240674 A1 | 9/2012 | Sakuma | |
| 2013/0036806 A1 * | 2/2013 | Kohno | G01F 1/684 73/114.33 |
| 2013/0105137 A1 | 5/2013 | Kohno et al. | |
| 2013/0118242 A1 | 5/2013 | Sudou | |
| 2013/0152699 A1 | 6/2013 | Suzuki et al. | |
| 2014/0331761 A1 * | 11/2014 | Kaifu | F02M 35/10386 73/204.25 |
| 2015/0000395 A1 | 1/2015 | Tashiro et al. | |
| 2015/0122012 A1 | 5/2015 | Tokuyasu et al. | |
| 2016/0281659 A1 | 9/2016 | Kaifu | |

* cited by examiner

AIR FLOW MEASURING DEVICE

CROSS REFERENCE TO RELATED APPLICATION

The present application is a continuation application of U.S. patent application Ser. No. 15/178,628, filed Jun. 10, 2016, which is based on reference Japanese Patent Application No. 2013-99164 filed on May 9, 2013 and claims the benefit of U.S. application Ser. No. 14/262,998, filed on Apr. 28, 2014, the disclosure of which is incorporated herein by reference.

TECHNICAL FIELD

The present disclosure relates to an air flow measuring device configured to measure a quantity of air flow.

BACKGROUND

For example, Patent Document 1 discloses a conventional air flow measuring device, which includes a sensor assembly and an end terminal molded in a resin housing.

Patent Document

Publication of unexamined Japanese patent application No. 2011-106868

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
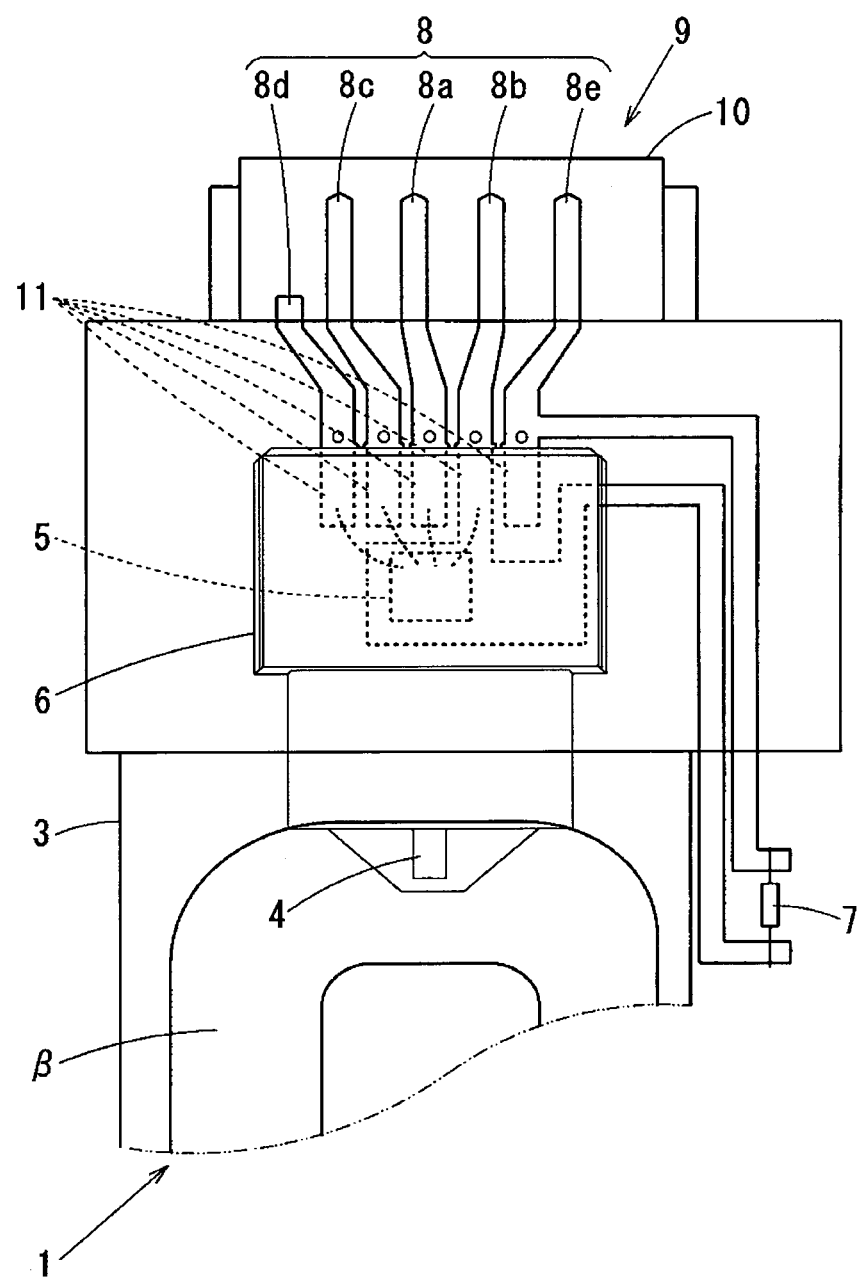
FIG. 1 is a schematic sectional view showing a main portion of an air flow measuring device.
Figure 2:
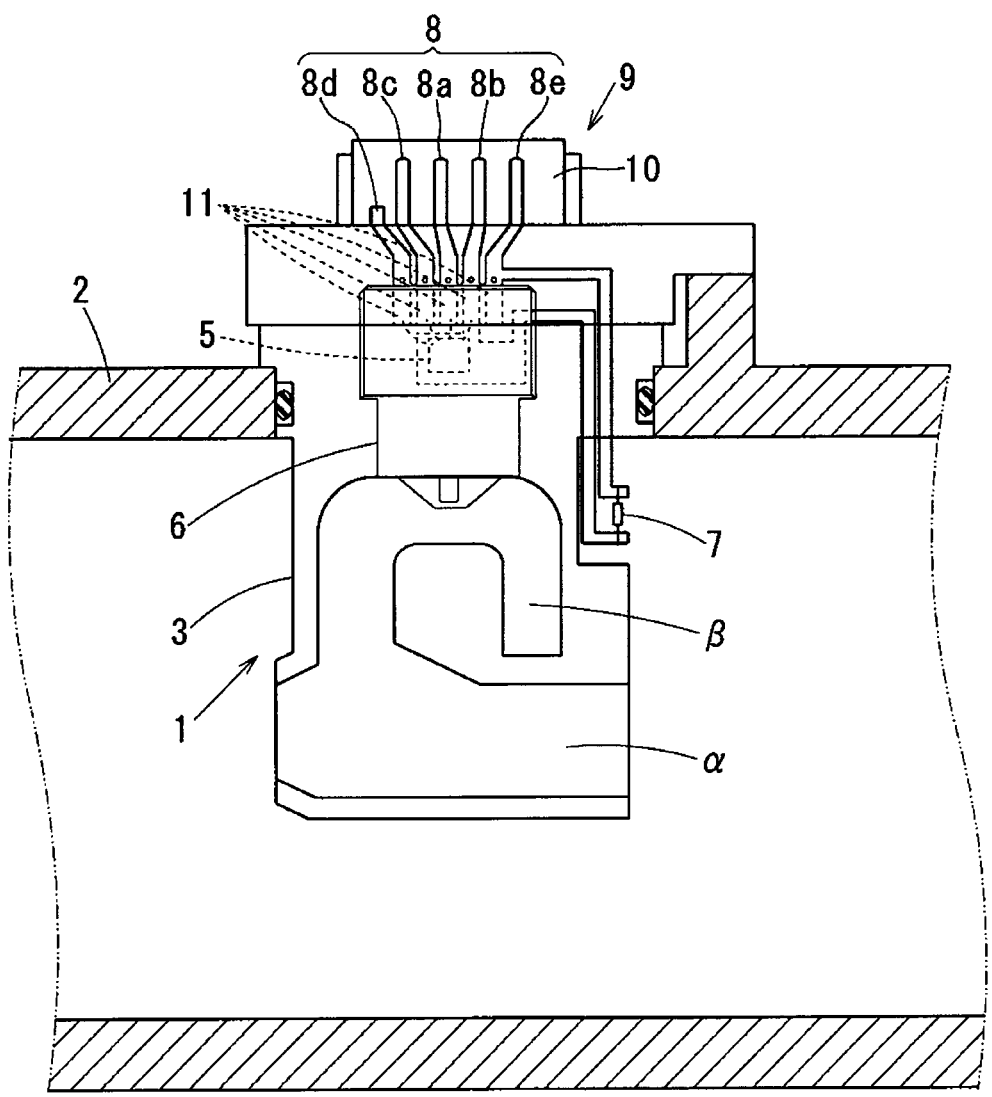
FIG. 2 is a schematic sectional view showing the air flow measuring device equipped to a duct.

A first embodiment of the present disclosure will be described with reference to FIGS. 1 and 2. An air flow measuring device 1 is equipped to an air intake duct 2, which is to draw intake air to an internal combustion engine of a vehicle when the vehicle is, for example, travelling. More specifically, the air intake duct 2 is equipped to, for example, a duct, which is located at an outlet of an air cleaner, or equipped to an intake pipe at a downstream of an air cleaner.

The air flow measuring device 1 is a thermal airflow meter configured to measure a quantity of intake air (intake air quantity, air flow quantity) drawn into the engine.

The air flow measuring device 1 includes a resin housing 3, a sensor assembly 6, and end terminals 8. The resin housing 3 (passage formation member) is equipped to the air intake duct 2. The sensor assembly 6 includes a sensor portion 4 and a sensor circuit 5, which are integrated with each other. The sensor portion 4 is configured to measure the air flow quantity. A thermistor 7 is equipped independently (separately) from in the sensor assembly 6. The thermistor 7 is configured to measure a temperature of intake air (air temperature). The end terminals 8 are configured to electrically connect the sensor assembly 6 with the thermistor 7.

The resin housing 3 is a secondary-molded product of resin. The interior of the resin housing 3 forms a bypass passage α and a sub-bypass passage β. The bypass passage α is configured to draw a part of intake air, which flows through the air intake duct 2. Specifically, the air intake duct 2, which is equipped with the air flow measuring device 1, has an AFM mount hole. The AFM mount hole extends through the air intake duct 2. The AFM mount hole may communicate the inside of the air intake duct 2 with the outside of the air intake duct 2. A main portion of the resin housing 3 is inserted from the outside of the AFM mounting hole into the air intake duct 2. Mores specifically, a portion of the resin housing 3, which forms the bypass passages α and β, is inserted into the air intake duct 2. Subsequently, the resin housing 3 is fixed to the air intake duct 2 by, for example, fastening the resin housing 3 to the air intake duct 2 with a tapping screw. In this way, the air intake duct 2 is equipped to the air flow measuring device 1.

The sensor portion 4 is inserted into the sub-bypass passage β. The sensor portion 4 is configured to generate, for example, a voltage signal according to the a quantity of intake air flow, which is a part of intake air flow passing through the sub-bypass passage β. In the present example, the sensor portion 4 employs a chip-form configuration. More specifically, the sensor portion 4 is configured with, for example, a thin film-type circuit board. The sensor circuit 5 is configured to compensate the quantity of intake air flow detected with the sensor portion 4. The sensor circuit 5 is further configured to A/D convert the compensated quantity of intake air flow and to send a signal representing the quantity of intake air flow. The sensor circuit 5 may implement, for example, frequency modulation on the compensated quantity of intake air flow.

The sensor assembly 6 is formed by integrally molding the sensor portion 4 and the sensor circuit 5 of primary molding resin. More specifically, the sensor portion 4 has a section, which includes a sensor circuit board and excludes an air flow quantity measurement element, and the section of the sensor portion 4 is integrally molded with the sensor circuit 5. Subsequently, the sensor portion 4 and the sensor circuit 5, which are integrally molded together, are further molded with the resin housing 3. The sensor circuit 5 is molded with the sensor assembly 6 and is further connected electrically with an ECU (engine control unit) through a connector 9. The connector 9 is equipped to the resin housing 3 and located at an upper portion of the resin housing 3 in the drawing. The ECU is located in the vehicle at a position different from a position at which the air flow measuring device 1 is located.

The connector 9 includes a resin coupler 10 and the end terminals 8. The resin coupler 10 is formed as a part of the resin housing 3. The end terminals 8 are exposed at those ends inside the resin coupler 10. As shown in FIGS. 1 and 2, the connector 9 is a male connector including the resin coupler 10 and the end terminals 8. The resin coupler 10 is formed in a female shape. The end terminals 8 are projected from a bottom surface of the resin coupler 10 into the resin coupler 10. In the present embodiment, the end terminals 8 includes an electric power source end terminal 8a, a grounding end terminal 8b, a flow output end terminal 8c, a control end terminal 8d, a temperature output end terminal 8e, and/or the like.

The connector 9 described above is one example and may be modified arbitrarily. For example, the connector 9 may be a female connector, dissimilarly to the present embodiment. In addition, according to the present embodiment, the connector 9 is configured to receive a connected device at its upper portion from its upper side. It is noted that, the connector 9 may receive a connected device at its side portion in a lateral direction. The arrangement of the end terminals 8 is one example and may be modified arbitrarily.

The sensor assembly 6 includes external connection terminals 11. The external connection terminals 11 are configured to be connected electrically with the sensor portion 4 and/or the sensor circuit 5. The external connection terminals 11 are configured to connect the sensor portion 4 and the sensor circuit 5 electrically with an external device. The external device is outside a molded product, which is molded of the primary molding resin to form the sensor assembly 6. That is, the external connection terminals 11 are common to the end terminals 8. In other words, the external connection terminals 11 are formed of common components with the end terminals 8.

Specifically, the external connection terminals 11 according to the present embodiment are formed by implementing a press working to punch the external connection terminals 11 out of a metal plate, which is excellent in conductivity. The metal plate is, for example, a copper thin plate. The external connection terminals 11 are formed in this way, thereby to simultaneously form the electric power source end terminal 8a, the grounding end terminal 8b, the flow output end terminal 8c, the control end terminal 8d, and the temperature output end terminal 8e. The grounding end terminal 8b also serves as a grounding electrode of the sensor portion 4, the sensor circuit 5, and the thermistor 7. The sensor portion 4 and the sensor circuit 5 are equipped to the grounding end terminal 8b in the sensor assembly 6. The sensor portion 4 and the sensor circuit 5 are connected by way of an electric connection element, such as a bonding wire, with corresponding end terminals, such as the electric power source end terminal 8a, the grounding end terminal 8b, the flow output end terminal 8c, the control end terminal 8d, and/or the like.

To the contrary, the thermistor 7 is located outside the resin housing 3 and exposed to the exterior of the resin housing 3. Specifically, the thermistor 7 is a resistive element, which changes its resistance according to change in temperature. One lead wire of the thermistor 7 is joined electrically and mechanically with an end of the grounding end terminal 8b. The end of the grounding end terminal 8b is exposed to the interior of the air intake duct 2. The other lead wire of the thermistor 7 is joined electrically and mechanically with an end of the temperature output end terminal 8e. The end of the temperature output end terminal 8e is exposed to the interior of the air intake duct 2.

It is noted that, the portions of the end terminals 8, which are joined with the thermistor 7, may be restricted from being exposed directly to air, dissimilarly to the present embodiment. That is, the end of the grounding end terminal 8b and the end of the temperature output end terminal 8e, which are joined with the thermistor 7, may be restricted from being exposed directly to air. That is, the thermistor 7 may be first joined with the grounding end terminal 8b and the temperature output end terminal 8e of the end terminals 8, and subsequently, the joined portions between the thermistor 7 and the end terminals 8 may be molded with the resin housing 3.

(Effect)

As described above, in the air flow measuring device 1 according to the present the embodiment, the external connection terminals 11 of the sensor assembly 6 also functions as the end terminals 8 of the sensor assembly 6 and the thermistor 7. Thus, the present configuration enables to reduce the number of components in this way, compared with a conventional configuration. In addition, the present configuration enables to omit an assembling and joining process, which is for mechanically and electrically assembling and joining the external connection terminals 11 with the end terminals 8, from entire manufacturing process for the air flow measuring device 1. Thus, the present configuration enables to reduce a manufacturing cost for the air flow measuring device 1.

In addition, the present configuration enables to integrate (commonalize) the external connection terminals 11 with the end terminals 8. Therefore, the present configuration enables to reduce a cost incurred for joining the external connection terminals 11 with the end terminals 8. Thus, the present reduction in manufacturing cost enables to reduce entire cost for the air flow measuring device 1. In addition, the present configuration enables to reduce margins via which the external connection terminals 11 are joined with the end terminals 8. Therefore, the present configuration enables to downsize the air flow measuring device 1.

INDUSTRIAL APPLICABILITY

According to the above embodiment, the configuration of the present disclosure is applied to the air flow measuring device 1 configured to measure a quantity of intake air drawn into the engine. It is noted that, the configuration of the present disclosure may be applied to an air flow measuring device, which is for a device other than an engine.

As described above, the air flow measuring device according to the present disclosure includes the sensor assembly having the external connection terminal(s). The external connection terminal(s) also functions as the end terminal(s) of the sensor assembly and/or the thermistor. Therefore, the present configuration enables to reduce the number of components. In addition, the present configuration enables to omit the assembling and joining process, which is for joining the external connection terminal(s) mechanically and electrically with the end terminal(s). Furthermore, the present configuration enables to reduce the margins via which the external connection terminal(s) is joined with the end terminal(s). Therefore, the present configuration enables to reduce the manufacturing cost and the size of the air flow measuring device.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An air flow measuring device comprising:
    a sensor assembly including a sensor portion and a sensor circuit, which are integrated with each other and configured to measure an air flow quantity;
    a thermistor configured to measure an air temperature; and
    a metal plate including a grounding end terminal, wherein one lead wire of the thermistor is joined electrically with the grounding end terminal in the sensor assembly, the sensor circuit is disposed on the metal plate, and the sensor circuit is entirely overlapped with the metal plate in a direction perpendicular to the metal plate.

2. The air flow measuring device according to claim 1, wherein the sensor circuit entirely coincides with at least a part of the metal plate in the direction.

3. The air flow measuring device according to claim 1, wherein the metal plate further includes a metal body portion integrated with the grounding end terminal, the sensor circuit is disposed on the metal body portion, and the sensor circuit entirely coincides with at least a part of the metal body portion in the direction.

4. The air flow measuring device according to claim 1, further comprising:

a connector; and at least four end terminals extending to the connector.

5. The air flow measuring device according to claim 1, further comprising:

a control end terminal; and at least one end terminal, wherein the control end terminal, the at least one end terminal, and the grounding end terminal extend in a same direction, and the control end terminal is located at an outermost position among the control end terminal, the at least one end terminal, and the grounding end terminal.

6. The air flow measuring device according to claim 1, further comprising:

a connector;

an electric power source end terminal;

a flow output end terminal;

a control end terminal; and a temperature output end terminal, wherein the electric power source end terminal, the grounding end terminal, the flow output end terminal, and the temperature output end terminal extend to the connector and are longer than the control end terminal.

7. The air flow measuring device according to claim 1, further comprising:

a temperature output end terminal, wherein the grounding end terminal and the temperature output end terminal are adjacent to each other.

8. The air flow measuring device according to claim 1, further comprising:

an electric power source end terminal; and a temperature output end terminal, wherein the grounding end terminal is located between the electric power source end terminal and the temperature output end terminal.

9. The air flow measuring device according to claim 1, further comprising:

a flow output end terminal; and a temperature output end terminal, wherein the grounding end terminal is located between the flow output end terminal and the temperature output end terminal.

10. The air flow measuring device according to claim 1, further comprising:

an electric power source end terminal; and a flow output end terminal, wherein the electric power source end terminal and the flow output end terminal are adjacent to each other.

11. The air flow measuring device according to claim 1, further comprising:

an electric power source end terminal;

a flow output end terminal; and a control end terminal, wherein the flow output end terminal is located between the control end terminal and the electric power source end terminal.

12. The air flow measuring device according to claim 1, further comprising:

a connector;

an electric power source end terminal;

a flow output end terminal; and a temperature output end terminal, wherein the electric power source end terminal, the grounding end terminal, the flow output end terminal, and the temperature output end terminal are longer than a half of a length of the connector.

13. The air flow measuring device according to claim 1, further comprising:

a connector; and a control end terminal, wherein the control end terminal is shorter than a half of a length of the connector.

14. The air flow measuring device according to claim 1, further comprising:

an electric power source end terminal;

a flow output end terminal;

a control end terminal; and a temperature output end terminal, wherein each of the electric power source end terminal, the grounding end terminal, the flow output end terminal, the control end terminal, and the temperature output end terminal is bent at least one intermediate portion.

15. The air flow measuring device according to claim 14, further comprising:

a connector, wherein the at least one intermediate portion includes a first intermediate portion and a second intermediate portion, and the first intermediate portion is on a side of the sensor assembly, the second intermediate portion a side of the connector, each of the electric power source end terminal, the grounding end terminal, the flow output end terminal, the control end terminal, and the temperature output end terminal is bent at the first intermediate portion to extend outward in a width direction of the connector, and each of the electric power source end terminal, the grounding end terminal, the flow output end terminal, the control end terminal, and the temperature output end terminal is bent at the second intermediate portion to extend straight in a height direction of the connector.

16. The air flow measuring device according to claim 1, wherein the metal plate is a punched copper thin plate formed by press working.

17. The air flow measuring device according to claim 1, wherein the thermistor is joined with the metal plate at a joined portion, and the joined portion is molded with resin.

18. An air flow measuring device comprising:

a sensor assembly including a sensor portion and a sensor circuit, which are integrated with each other and configured to measure an air flow quantity;

a thermistor configured to measure an air temperature; and a metal plate including a grounding end terminal, wherein one lead wire of the thermistor is joined electrically with the grounding end terminal, the sensor circuit is disposed on the metal plate, and the sensor circuit entirely coincides with at least a part of the metal plate in a direction perpendicular to the metal plate.

19. The air flow measuring device according to claim 18, wherein the metal plate further includes a metal body portion integrated with the grounding end terminal, the sensor circuit is disposed on the metal body portion, and the sensor circuit entirely coincides with at least a part of the metal plate in the direction.

20. An air flow measuring device comprising:

a sensor assembly including a sensor portion and a sensor circuit, which are integrated with each other and configured to measure an air flow quantity;

a thermistor configured to measure an air temperature; and a metal plate including a grounding end terminal, wherein one lead wire of the thermistor is joined electrically with the grounding end terminal, the sensor circuit is disposed on the metal plate, the sensor circuit has a first projected area projected in a direction perpendicular to the metal plate, the metal plate has a second projected area projected in the direction, and the first projected area is entirely encompassed within the second projected area.

* * * * *